United States Patent [19]

Kudo

[11] Patent Number: 6,078,151
[45] Date of Patent: Jun. 20, 2000

[54] SIMPLE DYNAMIC FOCUS CIRCUIT HAVING SAW WAVE GENERATING CIRCUITS

[75] Inventor: Jo Kudo, Kanagawa, Japan

[73] Assignee: NEC Corporation, Tokyo, Japan

[21] Appl. No.: 09/048,860

[22] Filed: Mar. 26, 1998

[30] Foreign Application Priority Data

Mar. 27, 1997 [JP] Japan ................................. 9-075235

[51] Int. Cl.⁷ .................. G09G 1/04; H01J 29/58
[52] U.S. Cl. ............. 315/382; 315/382.1; 315/368.323; 348/806
[58] Field of Search ................ 315/382, 382.1, 315/368.23; 348/806

[56] References Cited

U.S. PATENT DOCUMENTS

| | | | |
|---|---|---|---|
| 3,757,161 | 9/1973 | Kline | 315/276 |
| 4,249,112 | 2/1981 | McKibben | 315/382 |
| 4,490,653 | 12/1984 | Olmstead | 315/403 |
| 4,536,682 | 8/1985 | Pierick | 315/387 |
| 4,633,144 | 12/1986 | McKibben | 315/382 |
| 4,677,340 | 6/1987 | Miller et al. | 315/10 |
| 4,683,405 | 7/1987 | Truskalo et al. | 315/371 |

FOREIGN PATENT DOCUMENTS

| | | |
|---|---|---|
| 63-214791 | 9/1988 | Japan . |
| 63-260365 | 11/1988 | Japan . |
| 1-132282 | 5/1989 | Japan . |
| 0364274 | 3/1991 | Japan . |
| 04-114580 | 4/1992 | Japan . |
| 4-114589 | 4/1992 | Japan . |
| 04-123662 | 11/1992 | Japan . |
| 5-300395 | 11/1993 | Japan . |
| 06-303449 | 10/1994 | Japan . |
| 06-80247 | 11/1994 | Japan . |

*Primary Examiner*—Edward P. Westin
*Assistant Examiner*—Nikita Wells
*Attorney, Agent, or Firm*—Scully, Scott, Murphy & Presser

[57] ABSTRACT

In a dynamic focus circuit for a CRT, a first saw wave generating circuit generates a first saw wave signal in reponse to a horizontal synchronization signal, and a first amplifier amplifies the first saw wave signal with a first gain. Also, a first differential amplifier, amplifies the difference in voltage between the output signal of the first amplifier and a first reference voltage signal, and a first multiplier, calculates a square value of the output signal of the first differential amplifier to generate a horizontal parabolic signal. Similarly, a vertical parabolic signal is generated by a second saw wave circuit, a second amplifier, a second differential amplifier and a second multiplier. The horizontal parabolic signal and the vertical parabolic signal are added by an adder to generate a focus control signal.

4 Claims, 7 Drawing Sheets

Fig. 6B

SIMPLE DYNAMIC FOCUS CIRCUIT HAVING SAW WAVE GENERATING CIRCUITS

BACKGROUND OF THE INVENTION

1. Field of the Invention

The present invention relates to a focus control circuit used for a cathode ray tube (CRT) display apparatus such as multi-scan type CRTs.

2. Description of the Related Art

In multi-scan type CRTs, a dynamic focus circuit is required to correct deviation in focus.

A first prior art dynamic focus circuit applies a parabolic wave generating circuit for a pin cushion distortion correction for a color CRT to a horizontal parabolic wave generating circuit and a vertical parabolic wave generating circuit, so that the location of an electron beam corresponds to parabolic waves, thus realizing a multi-scan type CRT (see JP-A-1-132282).

In the first prior art dynamic focus circuit, however, in a multi-scan type CRT, the time period from a start edge of a horizontal synchronization signal (or a vertical synchronization signal) to a start timing of a video signal time period has to be changed in accordance with the scanning frequencies, so that the circuit therefor becomes complex, which increases the manufacturing cost.

In a second dynamic focus circuit, a first triangular wave signal is generated to correspond to a vertical synchronization signal, so that an intermediate level of the first triangular wave signal is caused to be a ground level. Also, a second triangular wave signal is generated to correspond to a horizontal synchronization signal, so that an intermediate level of the second triangular wave signal is caused to be the ground level. Then, a square value of the first triangular wave signal is added to a square value of the second triangular signal, to obtain a focus control signal (see JP-A-4-114589).

In the second prior art dynamic focus circuit, however, a pulse width adjusting circuit is provided to receive the horizontal synchronization signal, so that the time period from a start edge of the horizontal synchronization signal to a start timing of a video signal period is adjusted. Also, a pulse width adjusting circuit is provided to receive the vertical synchronization signal, so that the time from a start edge of the vertical synchronization signal to a start timing of a video signal period is adjusted. Such pulse width adjusting circuits are very complex to respond to the scanning frequencies, which increases the manufacturing cost.

In a third prior art dynamic focus circuit, a time period from the start edge of a horizontal synchronization signal to a start timing of a video signal time period is preset, and a first triangular wave signal is generated on the basis of a delayed timing when this time period passes after a horizontal synchronization signal is generated. Then, a horizontal parabolic wave signal is generated in accordance with the first triangular wave signal using an integration circuit. On the other hand, a time period from the start edge of a vertical synchronization signal to a start timing of a video signal time period is preset, and a second triangular wave signal is generated on the basis of a delayed timing when this time period passes after a vertical synchronization signal is generated. Then, a vertical parabolic wave signal is generated in accordance with the second triangular wave signal using an integration circuit. Then, the horizontal parabolic wave signal is added to the vertical parabolic wave signal, to obtain a focus control signal (see JP-A-63-260365).

Even, in the third prior art dynamic focus circuit, the pulse width adjusting circuits of the second prior art dynamic focus circuit are necessary, which increases the manufacturing cost.

A fourth prior art dynamic focus circuit includes a parameter circuit for storing a plurality of focus characteristic parameters. Thus, one of the focus characteristic parameters is selected to respond to a multi-scan type CRT (see JP-A-63-214791 and JP-A-5-300395).

In the fourth prior art dynamic focus circuit, a memory for storing the focus characteristic parameters becomes large, which increases the manufacturing cost.

SUMMARY Of THE INVENTION

It is an object of the present invention to provide a simple dynamic focus circuit.

According to the present invention, in a dynamic focus circuit for a CRT, a first saw wave generating circuit generates a first saw wave signal in reponse to a horizontal synchronization signal, and a first amplifier amplifies the first saw wave signal with a first gain. Also, a first differential amplifier amplifies the difference in voltage between the output signal of the first amplifier and a first reference voltage signal, and a first multiplier, calculates a square value of the output signal of the first differential amplifier to generate a horizontal parabolic signal. Similarly, a vertical parabolic signal is generated by a second saw wave circuit, a second amplifier, a second differential amplifier and a second multiplier. The horizontal parabolic signal and the vertical parabolic signal are added by an adder to generate a focus control signal.

BRIEF DESCRIPTION OF THE DRAWINGS

The present invention will be more clearly understood from the description set forth below with reference to the accompanying drawings, wherein.

DESCRIPTION OF THE PREFERRED EMBODIMENT

Figure 1:
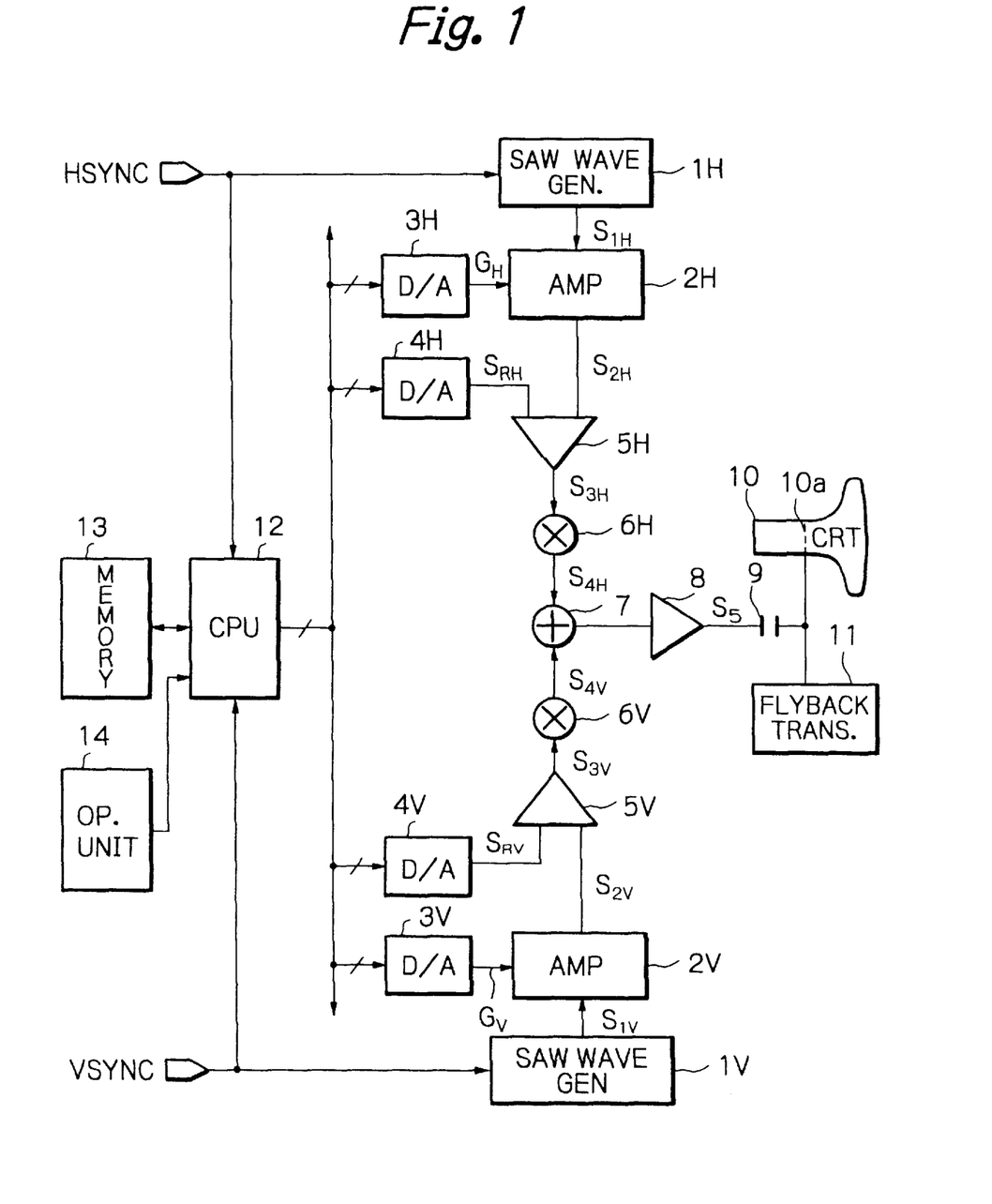
FIG. 1 is a block circuit diagram illustrating an embodiment of the dynamic focus circuit according to the present invention.

In FIG. 1, which illustrates an embodiment of the present invention, reference numeral 1H designates a saw wave generating circuit for receiving a horizontal synchronization signal HSYNC. An amplifier 2H amplifies an output signal $S_{1H}$ of the saw wave generating circuit 1H by using a gain $G_H$ from a digital/analog (D/A) converter 3H, and generates an output signal $S_{2H}$. Also, a D/A converter 4H generates a reference voltage signal $S_{RH}$. The output signal $S_{2H}$ of the amplifier 2H and the reference voltage signal $S_{RH}$ are supplied to a differential amplifier 5H, so that the difference in voltage between the signal $S_{2H}$ and the reference voltage signal $S_{RH}$ is amplified. An output signal $S_{3H}$ of the differential amplifier 5H is supplied to a multiplier 6H which calculates a square signal of the output signal of the multiplier 6V, i.e., a horizontal parabolic signal $S_{4H}$. The square signal $S_{4H}$ is supplied to an adder 7.

On the other hand, a saw wave generating circuit 1V receives a vertical synchronization signal VSYNC. An amplifier 2V amplifies an output signal $S_{1V}$ of the saw wave generating circuit 1V by using a gain $G_V$ from a D/A converter 3V, and generates an output signal $S_{2V}$. Also, a D/A converter 4V generates a reference voltage signal $S_{RV}$. The output signal $S_{2V}$ of the amplifier 2V and the reference voltage signal $S_{RV}$ are supplied to a differential amplifier 5V, so that the difference in voltage between the signal $S_{2V}$ and the reference voltage signal $S_{RV}$ is amplified. An output signal $S_{3V}$ of the differential amplifier 5V is supplied to a multiplier 6V which calculates a square signal of the output signal of the multiplier 6V, i.e., a vertical parabolic signal $S_{4V}$. The square signal $S_{4V}$ is supplied to the adder 7.

The adder 7 adds the horizontal parabolic signal $S_{4H}$ to the vertical parabolic signal $S_{4V}$, to generate a focus control signal $S_5$. The focus control signal $S_5$ is supplied via a coupling capacitor 9 to a focus grid 10a of a CRT 10. Note that a DC voltage is applied from a flyback transformer 11 to the focus grid 10a.

The D/A converters 3H, 4H, 3V and 4V are controlled by a central processing unit (CPU) 12 which is also connected to a memory 13 for storing control data and an operational unit 14 for setting adjusting data.

The reference voltage signal $S_{RH}$ is determined, so that a cross timing between the output signal $S_{2H}$ of the amplifier 2H and the reference voltage signal $S_{RH}$ is brought close to a center timing of a video signal time period. Also, the reference voltage signal $S_{RV}$ is determined, so that a cross timing between the output signal $S_{2V}$ of the amplifier 2V and the reference voltage signal $S_{RV}$ is brought close to a center timing of a video signal time period.

Further, the CPU 12 controls the D/A converters 3H, 4H, 3V and 4V to more-finely adjust the focus control signal $S_5$ in accordance with the outputs of the operational unit 14.

Figure 2:
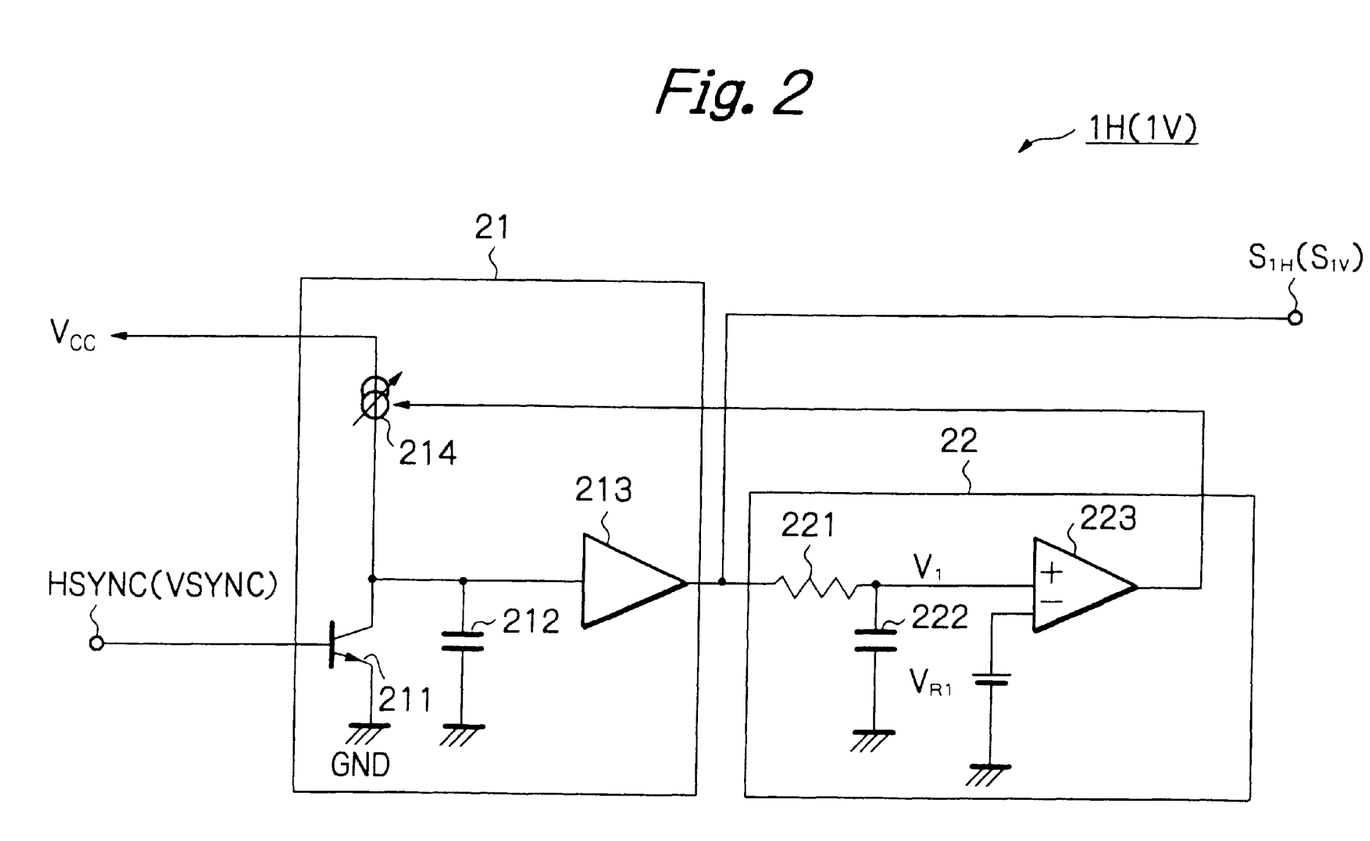
FIG. 2 is a detailed circuit diagram of the saw wave generating circuit of FIG. 1.

In FIG. 2, which is a detailed circuit diagram of the saw wave generating circuit 1H (1V) of FIG. 1, the saw wave generating circuit 1H (1V) is formed by a saw wave generating section 21 and a detection section 22. The saw wave generating section 21 includes a transistor 211 controlled by the horizontal synchronization signal HSYNC, (VSYNC) a capacitor 212, a voltage buffer 213 for generating the output signal $S_{1H}$ ($S_{1V}$), and a variable current source 214 controlled by the detection circuit 22. The detection circuit 22 includes a resistor 221 and a capacitor 222 forming an integration circuits (low-pass filter), and an operational amplifier 223 for comparing the voltage at the integration circuit with a reference voltage $V_{R1}$.

When the horizontal synchronization signal HSYNC (the vertical synchronization signal VSYNC) is high, the transistor 211 is turned ON, so that the capacitor 212 is discharged. Contrary to this, when the horizontal synchronization signal HSYNC (the vertical synchronization signal VSYNC) is low, the transistor 211 is turned OFF, so that the capacitor 212 is charged by the variable current source 214. The larger the output voltage of the detection circuit 22, the smaller the current flowing through the variable current source 214. The voltage at the capacitor 212 is output from the voltage buffer 213 as the output signals $S_{1H}$ ($S_{1V}$).

Figures 3A, 3B:
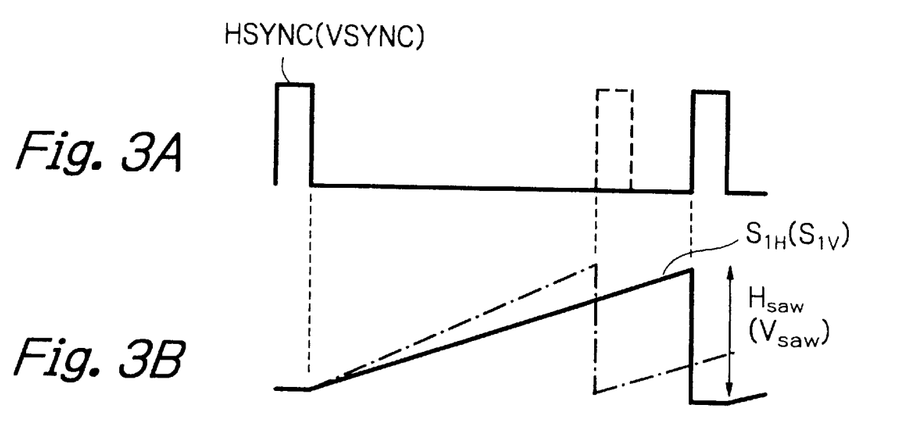
FIGS. 3A, 3B, 4A and 4B are timing diagrams showing the operation of the circuit of FIG. 1.

The output signal $S_{1H}$ ($S_{1V}$) is also supplied to the low-pass filter (221, 222) of the detection circuit 22. The voltage $V_1$ at the low-pass filter (221, 222) is applied to a non-inverting input of the operational amplifier 223, while the reference voltage $V_{R1}$ is applied to the inverting input of the operational amplifier 223. Therefore, the output voltage of the operational amplifier 223 is fed back to the variable current source 214, so that the voltage $V_1$ at the low-pass filter (221, 222) is brought close to $V_{R1}$. As a result, as shown in FIGS. 3A and 3B, the amplitude $H_{saw}$ ($V_{saw}$) of the saw wave signal $S_{1H}$ ($S_{1V}$) is approximately definite regardless of the frequency of the horizontal synchronization signal HSYNC (the vertical synchronization signal VSYNC).

Figure 4A:
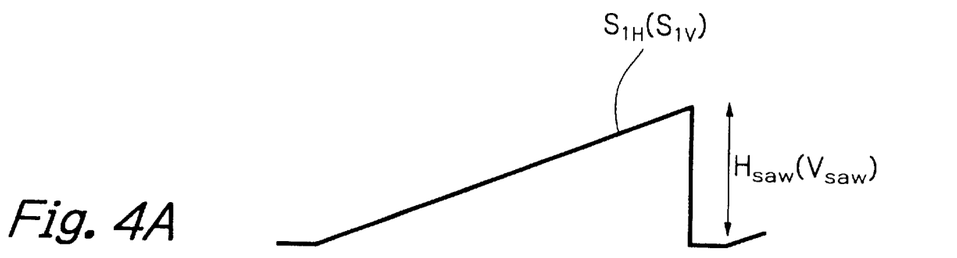
Figure 4B:
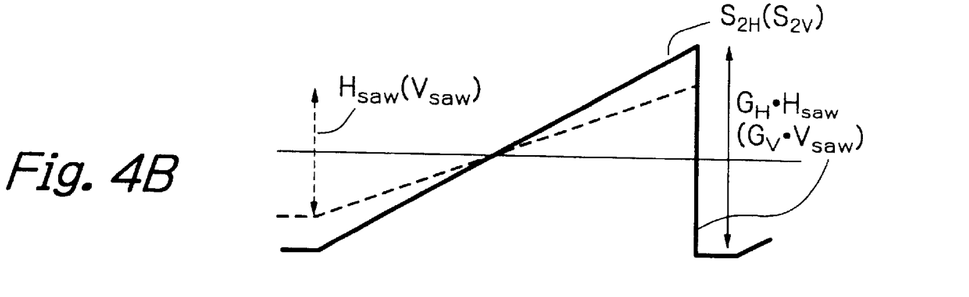

In the amplifier 2H (2V), the amplitude $H_{saw}$ ($V_{saw}$) of the saw wave signal $S_{1H}$ ($S_{1V}$) is controlled in accordance with the gain $G_H$ ($G_V$) supplied from the D/A converser 3H (3V). That is, as shown in FIGS. 4A and 4B, the amplitude of the output signal $S_{2H}$ ($S_{2V}$) of the amplifier 2H (2V) is $$G_H \cdot H_{SAW}(G_V \cdot V_{SAW}).$$

Figure 5:
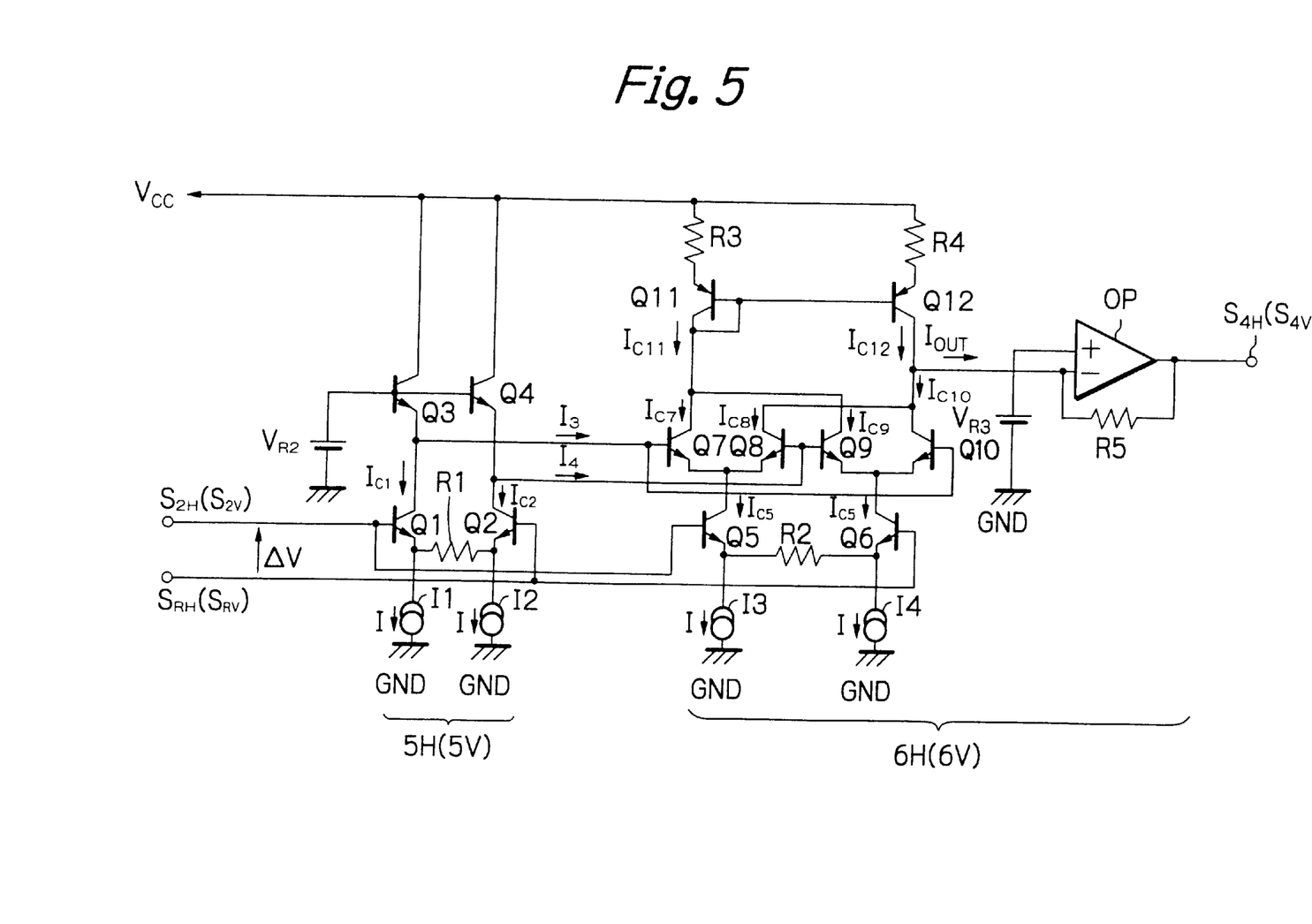
FIG. 5 is a detailed circuit diagram of the differential amplifier and the multiplier of FIG. 1.

In FIG. 5, which is a detailed circuit diagram of the differential amplifier 5H (5V) and the multiplier 6H (6V) of FIG. 1, the signals $S_{2H}$ ($S_{2V}$) and $S_{RH}$ ($S_{RV}$) are also supplied to the multiplier 6H (6V), although it is not illustrated in FIG. 1.

The differential amplifier 5H (5V) is formed by constant current sources I1 and I2, a resistor R1, a transistor Q1 for receiving the output signal $S_{2H}$ ($S_{2V}$), a transistor Q2 for receiving the reference voltage signal $S_{RH}$ ($S_{RV}$), and transistors Q3 and Q4 whose bases receive a reference voltage $V_{R2}$. The transistors Q1 and Q2 form a differential pair, and the transistors Q3 and Q4 form current sources for the differential pair.

If the difference in voltage between the signals $S_{2H}$ and $S_{RH}$ is $\Delta V$, the collector currents $I_{C1}$ and $T_{C2}$ flowing through the transistors Q1 and Q2 can be represented by $$I_{C1} = I + \Delta V/R1 \tag{1}$$

$$I_{C2} = I - \Delta V/R1 \tag{2}$$

where I is a current flowing through each of the constant current source I1 and I2. Therefore, the output currents $I_3$ and $I_4$ of the differential amplifier 5H can be represented by $$I_3\ I + \Delta V/R1 \tag{3}$$

$$I_4\ I - \Delta V/R1 \tag{4}$$

Note that the difference between the output current $I_3$ and $I_4$ represents the difference between the signals $S_{2H}$ ($S_{2V}$) and $S_{RH}$ ($S_{RV}$).

The multiplier 6H (6V) is formed by constant current sources I3 and I4, a resistor R2, a transistor Q5 for receiving the output signal S2, ($S_{2V}$), a transistor Q6 for receiving the reference voltage signal $S_{RH}$ ($S_{RV}$), a transistor Q7 for receiving the output current $I_3$, a transistor Q8 for receiving the output current $I_4$, a transistor Q9 for receiving the output current $I_4$, a transistor Q10 for receiving the output current $I_3$, transistor Q11 and Q12, and resistors R3 and R4. In this case, the transistors Q5 and Q6 form a differential pair, the transistors Q7 and Q8 form a differential pair, and the transistors Q7 and Q10 form a differential pair. Also, the transistors Q11 and Q12 form current sources for the transistors Q7, Q8, Q9 and Q10. Further, the transistors Q11 and Q12 form a current mirror circuit.

Additionally, the multiplier 6H (6V) includes an operational amplifier OP associated with a feedback resistor R5. In this case, a reference voltage $V_{R3}$ is applied to the non-inverting input of the operational amplifier OP.

Also, assume that a current flowing through each of the constant current sources I3 and I4 is I. In this case, the collector currents $I_{C5}$ and $I_{C6}$ flowing through the transistors Q5 and Q6 can be represented by $$I_{C5}=I+\Delta V/R2 \quad (5)$$

$$I_{C6}=I-\Delta V/R2 \quad (6)$$

Also, the collector currents $I_{C7}$ and $I_{C8}$ flowing through the transistors Q7 and Q8 can be represented by $$I_{c7} = (I_3/(I_3+I_4)) \cdot I_{c5} \quad (7)$$
$$= (1/2I) \cdot (I+\Delta V/R2) \cdot (I+\Delta V/R3)$$

$$I_{c8} = (I_4/(I_3+I_4)) \cdot I_{c5} \quad (8)$$
$$= (1/2I) \cdot (I-\Delta V/R2) \cdot (I+\Delta V/R3)$$

Further, the collector currents $I_{C9}$ and $I_{C10}$ flowing through the transistors Q9 and Q10 can be represented by $$I_{c9} = (I_4/(I_3+I_4)) \cdot I_{c6} \quad (9)$$
$$= (1/2I) \cdot (I-\Delta V/R2) \cdot (I-\Delta V/R3)$$

$$I_{c10} = (I_3/(I_3+I_4)) \cdot I_{c6} \quad (10)$$
$$= (1/2I) \cdot (I+\Delta V/R2) \cdot (I-\Delta V/R3)$$

The collector currents $I_{C11}$ and $T_{C12}$ of the transistors Q11 and Q12 can be represented by $$I_{C11}=I_{C7}+I_{C9} \quad (11)$$

$$I_{C12}=T_{C8}+I_{C10}I_{out} \quad (12)$$

where $I_{out}$ is an output current flowing through the resistor R5. In this case, the transistors Q11 and Q12 form a current mirror circuit, and the collector current $I_{C11}$ is the same as the collector current $I_{C12}$. That is, $$I_{C11}=I_{C12} \quad (13)$$

Therefore, from the formula (11), (12) and (13), the output current $I_{out}$ can be represented by $$I_{out} = I_{c7} + I_{c9} - I_{c8} - I_{c10} \quad (14)$$
$$= (2/(I \cdot R1 \cdot R2)) \cdot (\Delta V)^2$$

Further, the voltage of the output signal $S_{4H}$ ($S_{4V}$) can be represented by $$S_{4H}(S_{4V})=V_{R3}-R5 \cdot I_{out}=V_{R3}-(2 \cdot R5/(I \cdot R1 \cdot R2)) \cdot (\Delta V)^2 \quad (15)$$

Figure 6A:
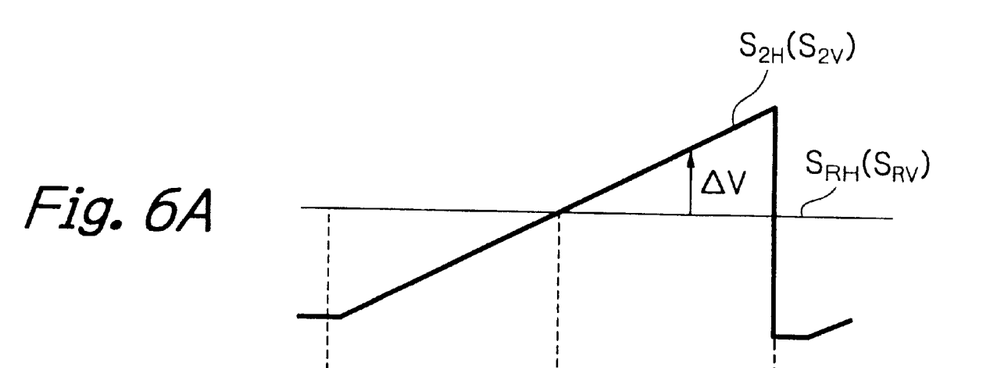
FIGS. 6A and 6B are timing diagrams showing the operation of the circuit of FIG. 5.
Figure 6B:
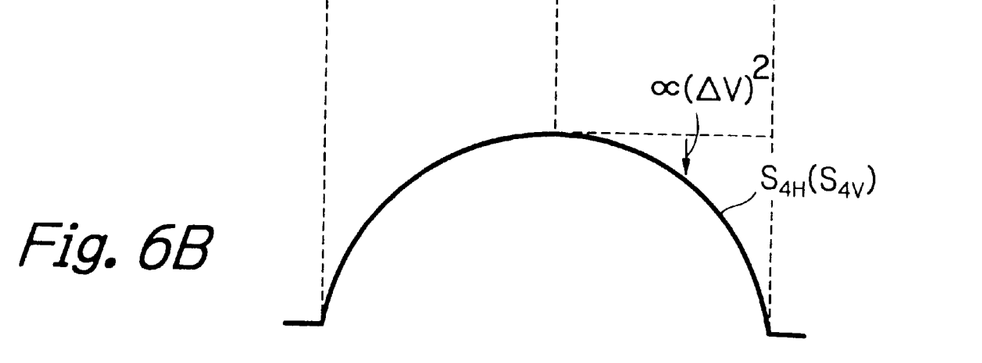

Thus, if the output signal $S_{2H}(S_{2V})$ and the reference voltage signal $S_{RH}(S_{RV})$ are as shown in FIG. 6A, the output signal $S_{4H}$ ($S_{4V}$) is parabolic as shown in FIG. 6B.

The determination of the reference voltage signal $S_{RH}$ is explained next with reference to FIGS. 7A, 7B, 7C and 7D.

Figure 7A:
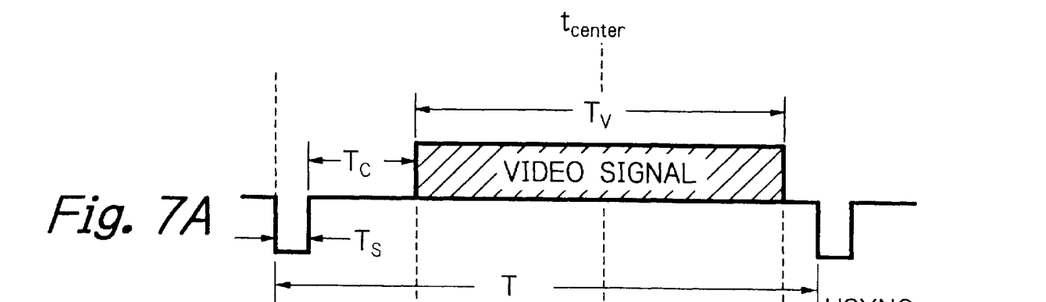
FIGS. 7A, 7B, 7C and 7D are timing diagrams showing the operation of the CPU of FIG. 1.
Figure 7B:
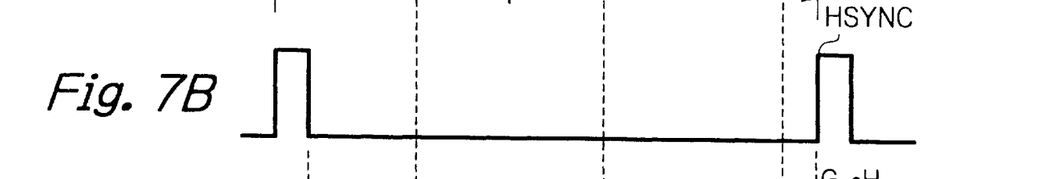

A video signal is shown in FIG. 7A, and a horizontal synchronization signal HSYNC is shown in FIG. 7B. In FIGS. 7A and 7B, $T_s$ is a pulse width time period of the horizontal synchronization signal HSYNC, $T_C$ is a pulse width time period from an end timing of the horizontal synchronization signal HSYNC, In is a time period of a video signal, and T is a time period of the horizontal synchronization signal HSYNC. In this case, regardless of the frequency of the horizontal synchronization signal HSYNC, $$T_S=\alpha \cdot T \quad (16)$$

$$T_C=\beta \cdot T \quad (17)$$

$$T_V=\gamma \cdot T \quad (18)$$

where $\alpha$, $\beta$ and $\gamma$ are constants.

Figure 7C:
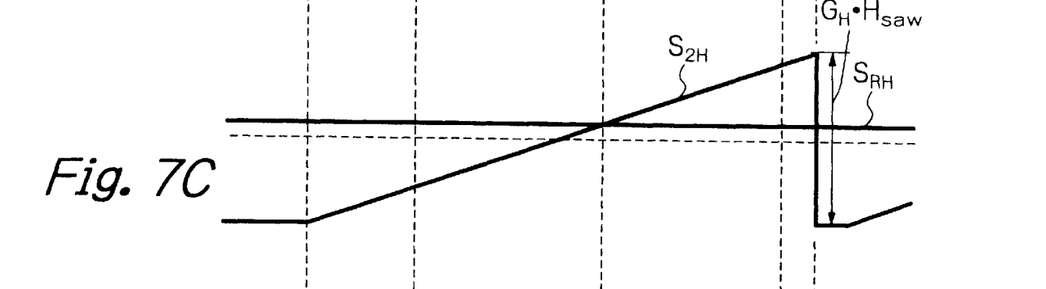

As shown in FIG. 7C, the output signal $S_{2H}$ of the amplifier 2H can be represented by $$S_{2H}(t)=G_H \cdot H_{saw} \cdot (t-T_S)/(T-T_S) \quad (19)$$

where $T_s \leq t \leq T$

Figure 7D:
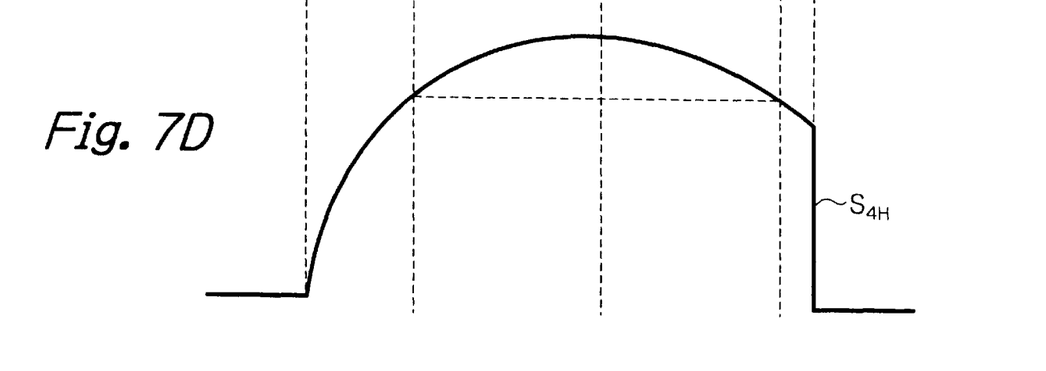

In order to take the center of parabolic signal $S_{4H}$ as shown in FIG. 7D coincide with the center of the video signal time period, the following condition has to be satisfied:

$$S_{RH} = S_{2H}(T_s + T_c + T_v/2)G_H \cdot H_{saw}(T_c + T_v/2)/(T-T_s) \quad (20)$$
$$= G_H \cdot H_{saw} \cdot (\beta + \gamma/2)/(1-\alpha)$$

Thus, the voltage of the reference voltage signal $S_{RH}$ depends upon only the gain $G_H$.

Similarly, the voltage of the reference voltage signal $S_{RV}$ can be represented by $$S_{RV}=G_V \cdot V_{saw} \cdot (\beta'+\gamma'/2)/(1-\alpha') \quad (21)$$

where $\alpha'$, $\beta'$ and $\gamma'$ are constants.

In other words, the voltages of the reference voltage signals $S_{RH}$ and $S_{RV}$ are definite unless the gains $G_H$ and $G_V$ are changed.

Figure 8:
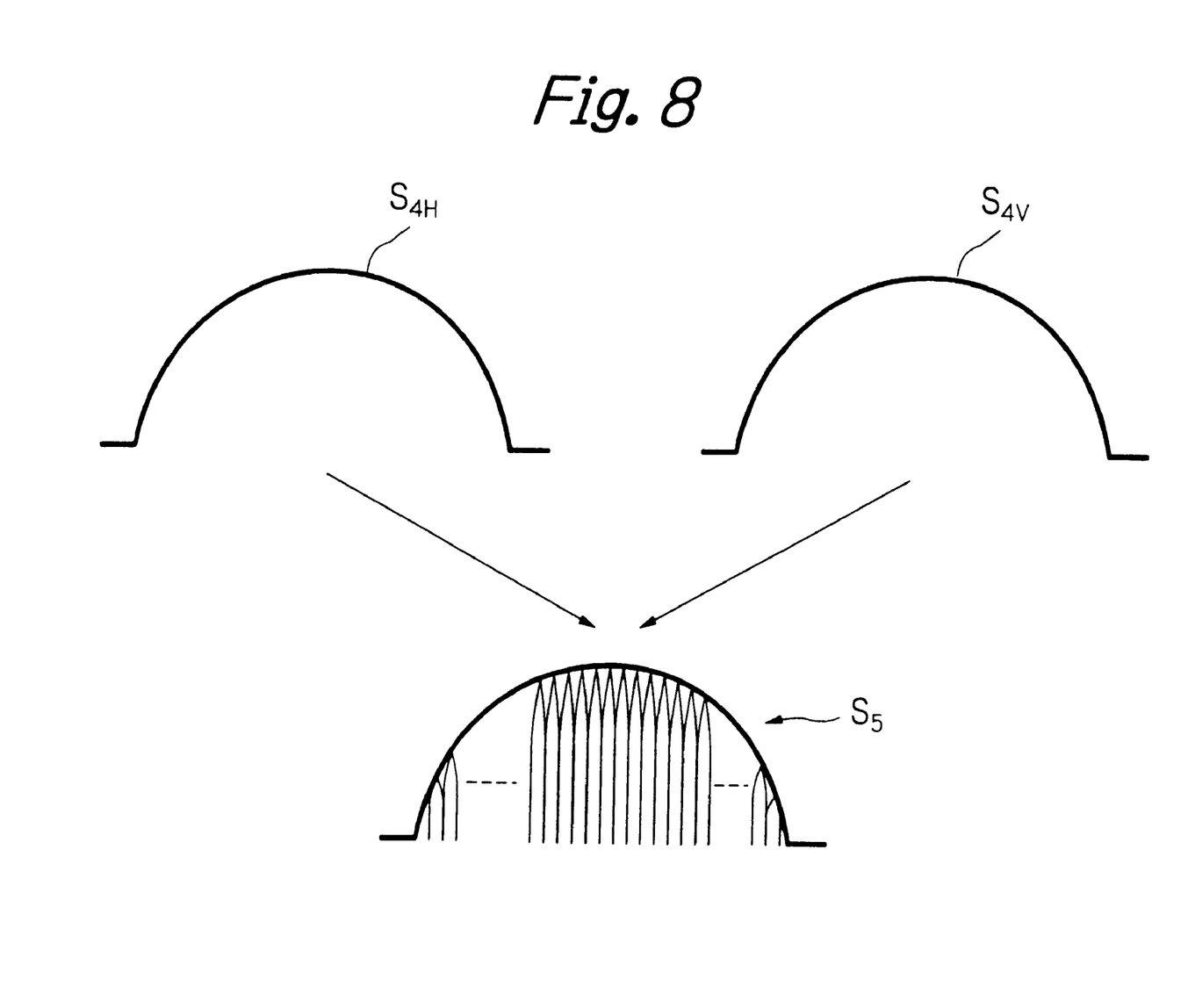
FIG. 8 is a timing diagram showing the operation of the adder of FIG. 1.

In the adder 7 and the amplifier 8 of FIG. 1, the parabolic output signal $S_{4H}$ and the parabolic output signal $S_{4V}$ are added to each other, to form a parabolic signal $S_5$ as shown in FIG. 8.

In the above-described embodiment, although the transistors are constructed by bipolar transistors, the transistors can be constructed by MOS transistors.

As explained hereinabove, according to the present invention, since pulse width adjusting circuits for adjusting a time period from a start timing of a horizontal synchronization signal (or a vertical synchronization signal) or the like are unnecessary, the dynamic focus circuit can be simplified Additionally, since the dynamic focus circuit can be digitally controlled, it is easy to finely adjust the circuit.

I claim:

1. A dynamic focus circuit for generating a focus control signal for a CRT, comprising:

a first saw wave generating circuit for receiving a horizontal synchronization signal and generating a first saw wave signal in response to said horizontal synchronization signal;

a first gain generating circuit for generating a first gain;

a first amplifier, connected to said first saw wave generating circuit and said first gain generating circuit, for amplifying said first saw wave signal with said first gain to generate an output signal;

a first reference voltage signal generating circuit for generating a first reference constant amplitude voltage signal;

a first differential amplifier, connected to said first amplifier and said first reference voltage signal generating circuit, for amplifying a difference in voltage between the output signal of said first amplifier and said first reference voltage signal to generate an output signal;

a first multiplier, connected to said first differential amplifier, for calculating a square value of the output signal of said first differential amplifier to generate a horizontal parabolic signal;

a second saw wave generating circuit for receiving a vertical synchronization signal and generating a second saw wave signal in response to said vertical synchronization signal;

a second gain generating circuit for generating a second gain;

a second amplifier, connected to said second saw wave generating circuit and said second gain generating circuit, for amplifying said second saw wave signal with said second gain to generate an output signal;

a second reference voltage signal generating signal circuit for generating a second reference constant amplitude voltage signal;

a second differential amplifier, connected to said second amplifier and said second reference voltage signal generating circuit, for amplifying a difference in voltage between the output signal of said second amplifier and said second reference voltage signal to generate an output signal;

a second multiplier, connected to said second differential amplifier, and for calculating a square value of the output signal of said second differential amplifier to generate a vertical parabolic signal; and an adder, connected to said first and second multipliers, for adding said horizontal parabolic signal to said vertical parabolic signal, to generate said focus control signal.

2. The dynamic focus circuit as set forth in claim 1, wherein said first saw wave generating circuit comprises:

a first saw wave generating section including a first capacitor, a first transistor connected to said first capacitor and controlled by said horizontal synchronization signal, a first variable current source connected to said first capacitor, and a first voltage buffer, connected to said first capacitor, for generating said first saw wave signal; and a first detection circuit including a first low-pass filter connected to said first voltage buffer and a first operational amplifier having a non-inverting input connected to said first low-pass filter, an inverting input to which a first reference voltage is applied, and an output, connected to said first variable current source, for controlling a current flowing through said first variable current source, said second saw wave generating circuit comprising:

a second saw wave generating section including a second capacitor, a second transistor connected to said second capacitor and controlled by said vertical synchronization signal, a second variable current source connected to said second capacitor, and a second voltage buffer, connected to said second capacitor, for generating said second saw wave signal; and a second detection circuit including a second low-pass filter connected to said second voltage buffer and a second operational amplifier having a non-inverting input connected to said second low-pass filter, an inverting input to which a second reference voltage is applied, and an output, connected to said second variable current source, for controlling a current flowing said second variable current source.

3. The dynamic focus circuit as set forth in claim 1, wherein said first differential amplifier comprises:

first and second constant current sources;

a first resistor connected between said first and second constant current sources;

a first transistor, connected to said first constant current source, for receiving the output signal of said first amplifier;

a second transistor, connected to said second constant current source, for receiving said first reference voltage signal;

a third transistor, connected to said first transistor, for supplying a collector current to said first transistor; and a fourth transistor, connected to said second transistor, for supplying a collector current to said second transistor, said first multiplier comprising:

third and fourth constant current sources;

a second resistor connected between said third and fourth constant current sources;

a fifth transistor, connected to said third constant current source, for receiving the output signal of said first amplifier;

a sixth transistor, connected to said fourth constant current source, for receiving said first reference voltage signal;

a seventh transistor connected to said fifth transistor and controlled by said third transistor;

an eighth transistor connected to said sixth transistor and controlled by said fourth transistor;

a ninth transistor connected to said fifth transistor and controlled by said fourth transistor;

a tenth transistor connected to said sixth transistor and controlled by said third transistor;

an eleventh transistor, connected to said seventh and ninth transistors, for supplying currents to said seventh and ninth transistors;

a twelfth transistor, connected to said eighth and tenth transistors, for supplying currents to said eighth and tenth transistors, said eleventh and twelfth transistors forming a first current mirror circuit; and a first operational amplifier connected to said twelfth transistor, for generating said horizontal parabolic signal;

said second differential amplifier comprising:

fifth and sixth constant current sources;

a third resistor connected between said fifth and sixth constant current sources;

a thirteenth transistor, connected to said fifth constant current source, for receiving the output signal of said second amplifier;

a fourteenth transistor, connected to said sixth constant current source, for receiving said second reference voltage signal;

a fifteenth transistor, connected to said thirteenth transistor, for supplying a collector current to said thirteenth transistor; and a sixteenth transistor, connected to said fourteenth transistor, for supplying a collector current to said fourteenth transistor, said second multiplier comprising:

seventh and eighth constant current sources;

a fourth resistor connected between said seventh and eighth constant current sources;

a seventeenth transistor, connected to said seventh constant current source, for receiving the output signal of said second amplifier;

an eighteenth transistor, connected to said eighth constant current source, for receiving said second reference voltage signal;

a nineteenth transistor connected to said seventeenth transistor and controlled by said fifteenth transistor;

a twentieth transistor connected to said seventeenth transistor and controlled by said sixteenth transistor;

a twenty-first transistor connected to said eighteenth transistor and controlled by said sixteenth transistor;

a twenty-second transistor connected to said eighteenth transistor and controlled by said fifteenth transistor;

a twenty-third transistor, connected to said nineteenth and twenty-first transistors, for supplying currents to said nineteenth and twenty-first transistors;

a twenty-fourth transistor, connected to said twentieth and twenty-second transistors, for supplying currents to said twentieth and twenty-second transistors, said twenty-third and twenty-fourth transistors forming a second current mirror circuit; and a second operational amplifier connected to said twenty-fourth transistor, for generating said vertical parabolic signal.

4. The dynamic focus circuit as set forth in claim 1, wherein said first and second gain generating circuits and said first and second reference voltage signal generating circuits comprise first, second, third and fourth D/A converters, respectively, said dynamic focus circuit further comprising a control circuit connected to said first, second, third and fourth D/A converters, said control circuit controlling said first and third D/A converters, so that a cross timing of the output signal of said first amplifier and said first reference voltage signal is brought close to a center timing of a video signal time period within each time period of said horizontal synchronization signal, said control circuit controlling said second and fourth D/A converters, so that a cross timing of the output signal of said second amplifier and said second reference voltage signal is brought close to a center timing of a video signal time period within each time period of said vertical synchronization signal.

* * * * *